(12) United States Patent
Lee

(10) Patent No.: US 6,584,149 B1
(45) Date of Patent: Jun. 24, 2003

(54) BLOCK-MODE EQUALIZATION FOR DATA COMMUNICATIONS

(75) Inventor: Keunmyung Lee, Palo Alto, CA (US)

(73) Assignee: Hewlett-Packard Development Company L.P.P., Houston, TX (US)

( * ) Notice: Subject to any disclaimer, the term of this patent is extended or adjusted under 35 U.S.C. 154(b) by 0 days.

(21) Appl. No.: 09/415,272

(22) Filed: Oct. 7, 1999

(51) Int. Cl.[7] .................................................. H03H 7/30
(52) U.S. Cl. ...................... 375/229; 375/296; 333/28 R
(58) Field of Search ................................ 375/229, 263, 375/296, 232; 365/185.25, 230.03, 233.5; 360/46, 65, 41; 333/28 R

(56) References Cited

U.S. PATENT DOCUMENTS 4,374,426 A * 2/1983 Burlage et al. ............. 708/323
6,266,379 B1 * 7/2001 Dally .......................... 375/296

OTHER PUBLICATIONS

Ramin Farjad–Rad, Chih–Kong Ken Yang, Mark A. Horowitz, & Tomas H. Lee,"A 0.4–um CMOS 10–Gb/s 4–PAM Pre–Emphasis Serial Link TRansmitter", IEEE Solid–State Circuits, vol. 34, No. 5, May, 1999,pp. 580–585.*
W.J.Dally and J. Poulton, "Transmitter Equalization for 4 Gb/s Signaling," in Proc. Hot Interconnects Symp., Aug. 1996, pp.29–39.*
Ramin Farjad–Rad, Chih–Kong Ken Yang, Mark A. Horowitz, and Thomas H. Lee, "A 0.4–um CMOS 10–Gb/s 4–PAM Pre–Emphasis Serial Link Transmitter", IEEE Journal of Solid–State Circuits, vol. 34, No. 5, May, 1999, pp. 580–585.
W.J. Dally and J. Poulton, "Transmitter Equalization for 4 Gb/s Signaling," in Proc. Hot Interconnects Symp., Aug. 1996, pp. 29–39.

* cited by examiner

*Primary Examiner*—Stephen Chin
*Assistant Examiner*—Edith Yeh

(57) ABSTRACT

A signal equalization system provides a block-mode equalization system for digital equalization in computer and networking systems in which a "1" bit pulse is followed by a significant negative bit and less significant negative bit pulses as a multiple groups with a lower bit rate. The magnitude of the grouped bit pulses, or blocks of equalization bit pulses, can be the average value of the individual bits to produce a clean output waveform. Since the block compensates for the lower frequency response of the channel, its effectiveness is not sensitive to the exact location of the pulses. This makes it possible to align the blocks in wide pulses having decreasing magnitudes and increasing durations. This further means that when data multiplexing is involved in driver circuitry for the signal transmitter, the block can be generated from a lower frequency clocked domain before the multiplexing without burdening the high frequency side of the driver circuitry.

21 Claims, 4 Drawing Sheets

BLOCK-MODE EQUALIZATION FOR DATA COMMUNICATIONS

FIELD OF THE INVENTION

The present invention relates generally to transmission of high data rate signals and more particularly to providing equalization to high data rate signals through a dispersive medium in computer and networking equipment.

BACKGROUND OF THE INVENTION

In the past, various equalization techniques have been used in the telecommunications industry to overcome transmission signal loss where digital signals are transmitted over long-distance cable. These techniques had to rely on complex and expensive equipment at both ends of a communication channel, but were feasible because the costs of the transmission lines were much more than the costs of the equipment at each end.

In the computer and networking industry, transmission losses have started to become a greater problem with the increase of data transmission speeds from megabytes per second to gigabytes per second. Although the distances in computers, for example between processors and memory, are very short, the high speeds cause high transmission signal loss. Unfortunately, the solutions used in the telecommunications industry are too expensive to be used in the computer industry, not only because of the equipment required at both ends of the transmission line, but because of the hundreds of channels required out of even a single integrated circuit of the hundreds of integrated circuits which may be involved in a multiprocessor system.

Equalization is one technique that has been used in the past is to provide an increased digital signal representing a 1 so that when it degrades through the transmission line, the degraded signal can still be identified as a "1" instead of a "0". However, as signal speeds increase, the output signal starts to have a long "tail" due to dispersion in the channel. This long tail causes intersymbol interference that makes it difficult to properly identify the "1's" and "0's".

One method of reducing the long tail is to send a sequence of negative pulses following the initial "1" signal. The magnitudes of the subsequent negative pulses can be easily calculated by measuring the output response. This technique is called digital equalization.

In one digital equalization technique, after the original signal bit, five subsequent negative bits of decreasing amplitude are sent out to remove the long tail in the output. It has been determined that the first negative bit is more significant and should have a greater negative amplitude than the remaining four bits. However, the remaining four bits cannot simply be eliminated because their combined effect is still large. These four bits help reduce the low frequency wander of the signal. In an actual circuit implementation, each negative bit has to be generated by a high-speed driver circuit connected to the output. While effective, this approach tends to be very costly.

A solution which would provide effective and inexpensive digital equalization has long been sought but has long eluded those skilled in the art.

DISCLOSURE OF THE PRESENT INVENTION

The present invention provides a block-mode equalization system for digital equalization in which a "1" bit pulse is followed by a significant negative bit and less significant negative bit pulses as a group with a lower bit rate. The magnitude of the grouped bit pulses, or block of equalization bit pulses, can be the average value of the individual bits to produce a clean output waveform. Since the block compensates for the lower frequency response of the channel, its effectiveness is not sensitive to the exact location of the pulses. This makes it possible to align the block in a wide pulse. This further means that when data multiplexing is involved in driver circuitry for the signal transmitter, the block can be generated from a lower frequency clocked domain before the multiplexing without burdening the high frequency side of the driver circuitry.

The present invention provides a block-mode equalization system for digital equalization in which a "1" bit pulse is followed by a significant negative bit and less significant negative bit pulses as a multiple groups with a lower bit rate. The magnitude of the grouped bit pulses, or blocks of equalization bit pulses, can be the average value of the individual bits to produce a clean output waveform. Since the block compensates for the lower frequency response of the channel, its effectiveness is not sensitive to the exact location of the pulses. This makes it possible to align the blocks in wide pulses having decreasing magnitudes and increasing durations. This further means that when data multiplexing is involved in driver circuitry for the signal transmitter, the block can be generated from a lower frequency clocked domain before the multiplexing without burdening the high frequency side of the driver circuitry.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
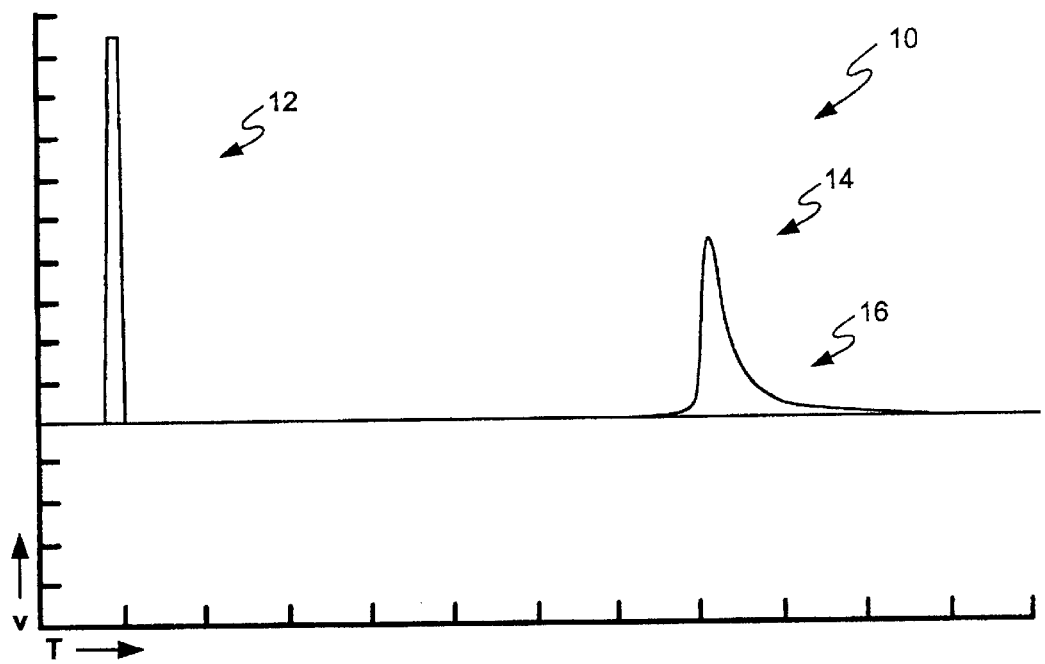
FIG. 1 (PRIOR ART) shows a graph of a pulse propagating through a frequency dependent lossy medium.

Referring now to FIG. 1 (PRIOR ART), therein is shown a waveform chart 10 of a pulse propagating through a frequency dependent lossy medium. An example of a frequency dependent lossy medium in computer technology would be the traces on a printed circuit board which allow communication between various integrated circuits mounted on the printed circuit board. The losses are due in part to increasing skin effect and dielectric loss. Skin effect causes increasing resistance because the current tends to flow more on the outer surface, the skin, of a conductor as frequency increases. Dielectric loss is the loss due to the non-ideal characteristics of an insulator which absorbs the energy of the propagating signal as frequency increases.

Mathematically, the skin loss increases in proportion to the square root of the frequency while the dielectric loss is directly proportional to the frequency. At frequencies of 1 gigahertz (GHz) or higher, the dielectric loss starts to exceed the skin loss in typical printed circuit boards in computer systems.

An input pulse 12 represents an amplified bit being transmitted from a typical integrated circuit. An output pulse 14 represents the input pulse 12 being received at another typical integrated circuit. Essentially, the output pulse 14 is basically about half the height of the input pulse 12 because of losses in the transmission channel. Further, the output pulse 14 is much wider than the input pulse 12 and has a large amplitude, long tail 16.

The long tail 16 starts to cause a problem when there are many input pulses close together, as would occur at gigahertz speeds. At very high speeds, the tails of different output pulses would run together with the subsequent output pulses making it difficult to determine where the "0's" and "1's" are in a high-speed data transmission.

Figure 2:
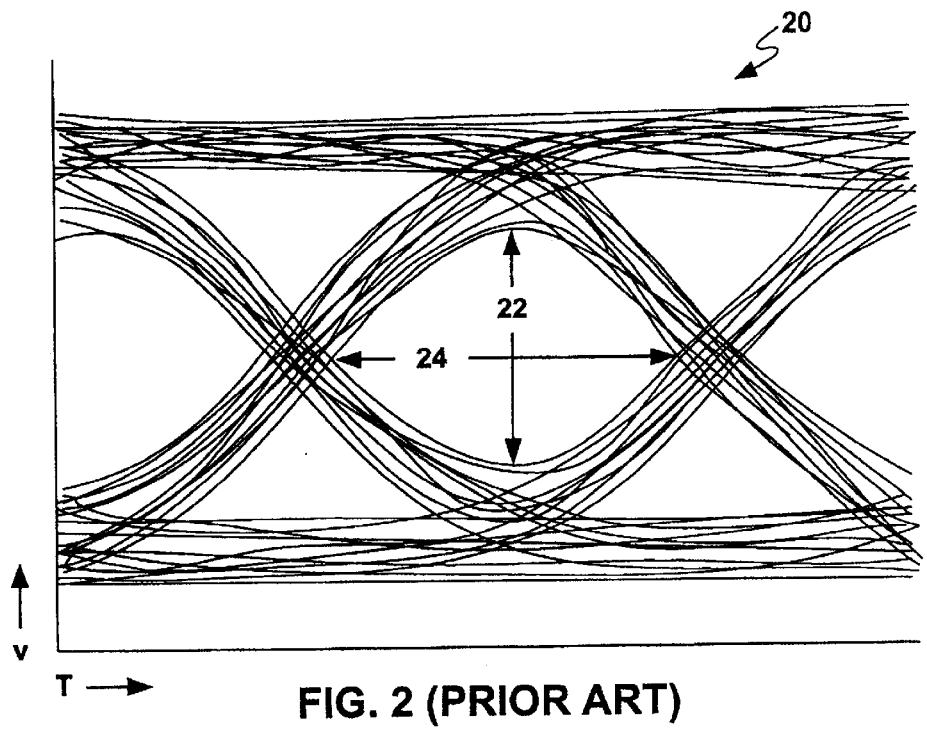
FIG. 2 (PRIOR ART) shows an eye diagram of a typical output waveform.

Referring now to FIG. 2 (PRIOR ART), therein is shown an eye diagram of the waveform of the output pulse 14 of FIG. 1 (PRIOR ART) through a lossy medium such as the traces of a printed circuit board.

The eye diagram, so called because it resembles a human eye, shows the clarity of a plurality of the output pulses 14 by taking a plurality of traces. The clarity of the signal may be determined by the size of the eye which has a height 22 and a width 24.

Figure 3:
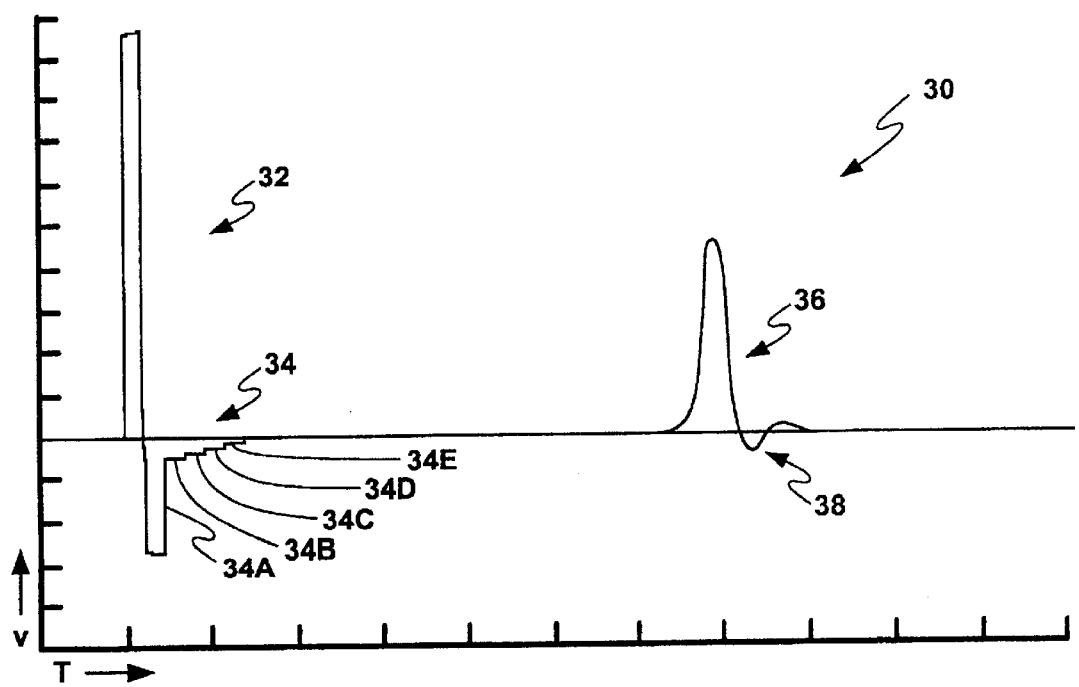
FIG. 3 (PRIOR ART) shows a pulse propagating through a frequency dependent lossy medium with conventional equalization.

Referring now to FIG. 3 (PRIOR ART), therein is shown a waveform chart 30 of an input pulse 32 propagating through a frequently dependent lossy medium with digital equalization through the application of a plurality of negative pulses. In the present example, five negative pulses 34A through 34E are provided. The first negative pulse 34A is more significant than the remaining four pulses 34B through 34E, each being successively less significant. The first negative pulse 34A has approximately thirty percent of the amplitude of the input pulse 32. It should be noted although they are less significant, the remaining four pulses 34B through E cannot be simply eliminated because their combined effect is still large. These four bits help reduce the lower frequency wander of the input pulse 32.

Also in waveform chart 30 is shown an output pulse 36 with a short negative tail 38 resulting from the input pulse 32 and the negative pulses 34A through 34E.

Figure 4:
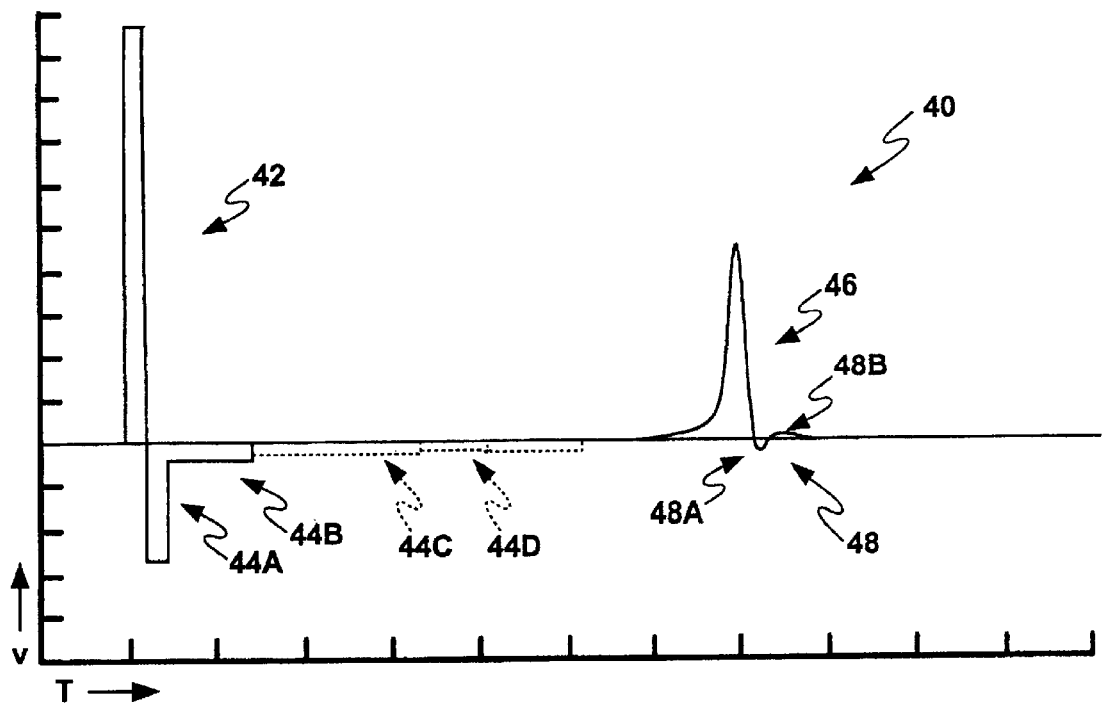
FIG. 4 shows a pulse propagating through a frequency dependent lossy medium with the block-mode equalization of the present invention.

Referring now to FIG. 4, therein is shown a waveform chart 40 having an input pulse 42. Block-mode equalization of the present invention is provided by providing a negative tail 44 comprising a significant negative pulse 44A and a less significant negative block pulse 44B. As the input, significant negative, and negative block pulses propagate through the frequency dependent lossy medium, they produce an output pulse 46 having a short tail 48 with a negative component 48A and a positive component 48B.

Essentially, FIG. 4 shows the results of block equalization when the second through fifth bits are grouped into a 4-bit wide pulse which is the average value of the individual bits 34B through 34E of FIG. 3. The output pulse 46 is almost identical in form to the output pulse 36 of FIG. 3. Since this 4-bit wide pulse of FIG. 4 compensates the lower frequency response of the channel, its effectiveness is not sensitive to the exact location of the pulse 44B. This makes it possible to align the block-mode equalization bits in common 4-bit wide pulses.

The negative bit is about 30 percent of the original bit and the negative polarity. If only one negative bit is sent, a tail will remain which will increase as speed increases. In the present invention, it has been determined that because the negative pulses are acting on the lower frequency domain, it does not matter whether small individual bits are appended or an approximate block of bits. The first negative bit is appended as a large bit, but all subsequent bits are lumped together as a single bit working at a much slower speed. This rate is much slower because all the four bits are combined together and an average value signal is sent. In FIG. 1 (PRIOR ART), a data bit is shown amplified to form the pulse 12. In FIG. 4, possible additional blocks of equalization pulses 44C and 44D are shown in dotted lines.

Figure 5:
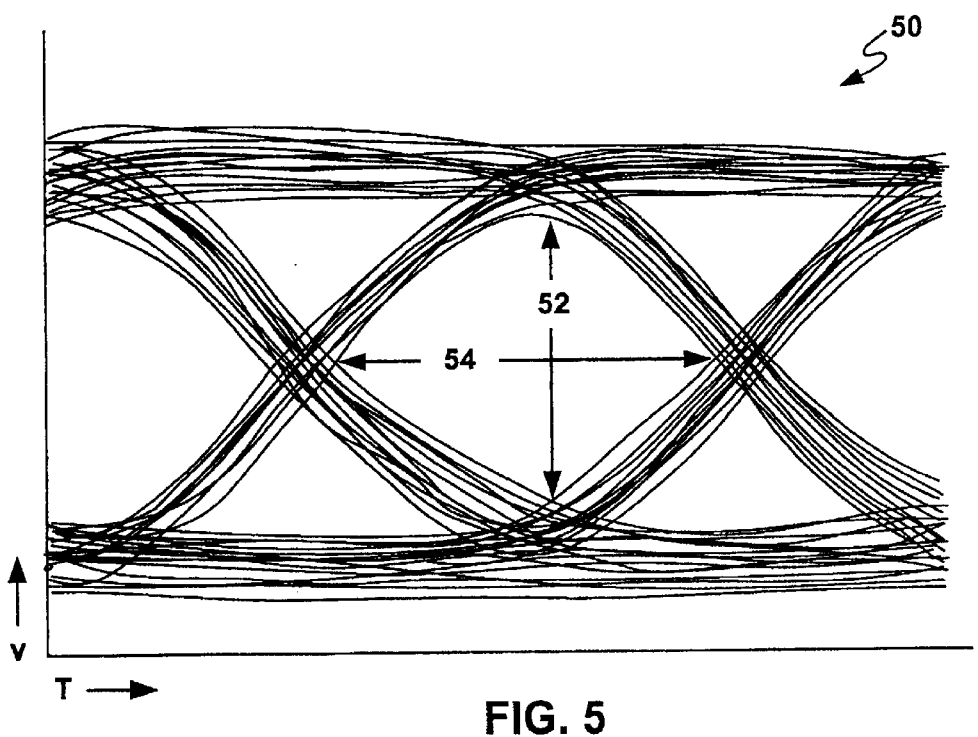
FIG. 5 shows an eye diagram of an output waveform with the block-mode equalization of the present invention.

Referring now to FIG. 5, therein is shown an eye diagram showing an output waveform 50 having a height 52 and a width 54. In actual testing, it has been determined that the output waveform 50 has a wider eye or a larger height 52 than the height 22 of the waveform 20 of FIG. 2 and also a larger width 54 than the width 24 of the waveform 20. The output waveform of the output pulse 36 of FIG. 3 is substantially the same as that of the output pulse 46 of FIG. 4.

Figure 6:
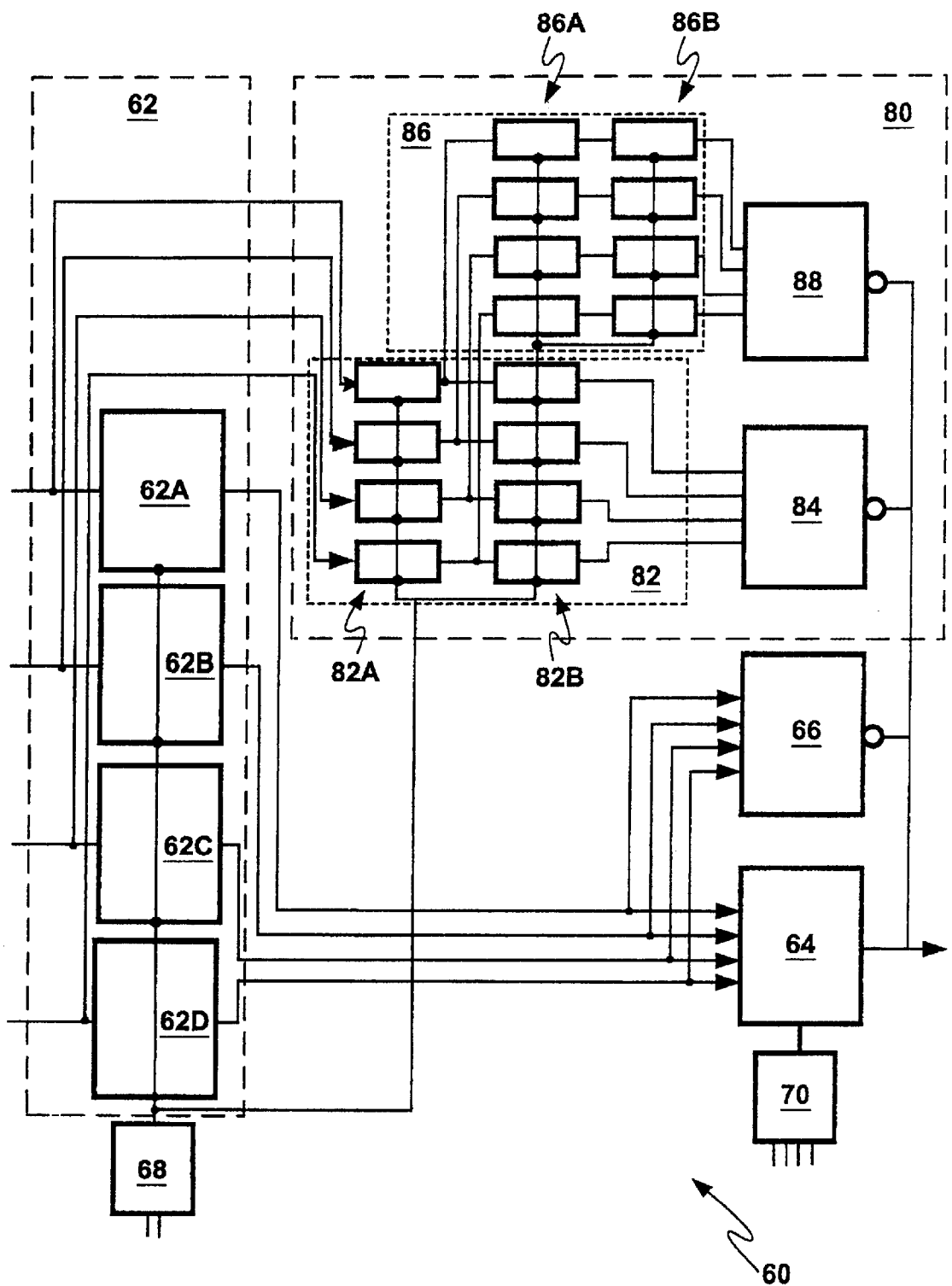
FIG. 6 shows an example of a circuit which can be used to implement the block-mode equalization of the present invention.

Referring now to FIG. 6, therein is shown an exemplary circuit implementation of block-mode equalization. A block-mode equalization circuit 60 consists of data input circuitry 62 connected to data output circuitry 64 and main block equalization circuitry 66. The data input circuitry 62 has a clock input 68 and the data output circuitry 64 has a clock input 70.

The block-mode equalization circuit 60 as shown further includes optional higher order block equalization circuitry 80 which includes secondary data input circuitry 82 connected to secondary block equalization circuitry 84 and tertiary data input circuitry 86 connected to tertiary block equalization circuitry 88.

The data input circuitry 62 receives a plurality of data input signals into a plurality of flip-flops. In the current example, there are four flip-flops 62A through 62D which receive four input signals and clock the signals out at a specific clock rate, for example one gigabit, based on the clock input 68. The four flip-flops 62A through 62D output signals in parallel to the data output circuitry 64 which is a conventional transmitter multiplexer in the present example.

The data output circuitry 64 serializes the signals from the data input circuitry 62 and provides a negative pulse after each positive pulse. The serialized output of the data output circuitry 64 is at a higher speed, such as four gigabits per second in the present example. This would provide the input pulse 42 and the negative pulse 44A shown in the waveform chart 40 of FIG. 4.

At the same time, the data input circuitry 62 provides inputs to the main block equalization circuitry 66 where the signals are averaged together and sent out at a much lower rate of one gigabit per second in the present invention so as to provide the block equalization pulse 44B per second as shown in waveform chart 40 of FIG. 4 at one GHz.

In FIG. 6, the clock 70 takes a four-phase clock serial to serialize the input signals at four times the incoming speed. The main, secondary, and tertiary block equalization circuitry 66, 84, and 88, respectively, each take in four bits but send out one bit at the same speed as the four parallel bits because the average value is taken and sent out at the same speed as the input. The signals are sent out as negative pulses through the use of inverters.

As speed continues to increase into the multi-gigahertz range, additional block equalizations become desirable.

In the present invention, two additional higher order block equalizations are achieved by having the initial incoming data provided to secondary data input circuitry 82 which places two additional sets of data flip-flops on each data input line before applying the signals to the secondary block equalization circuitry 84. The secondary block equalization circuitry 84 would average the inputs and invert them to provide time-delayed block equalization signals to the main block equalization pulse 44B. Further, the additional higher order block equalizations could be of lesser amplitude and longer duration as shown in FIG. 4 by time-delayed block equalization pulses 44C which is of lesser amplitude and longer duration than the negative block pulse 44B.

Subsequent higher order block equalizations could be added by interconnecting additional block equalization circuitry as exemplified by the tertiary block equalization circuitry made up of the tertiary data input circuitry 86 which is connected to the tertiary block equalization circuitry 88. The tertiary block equalization circuitry 88 would provide a further time-delayed, inverted block equalization pulse as shown as block equalization pulse 44D in the waveform chart 40 of FIG. 4. The block equalization pulse 44D would have a lesser magnitude and longer duration than the block equalization pulse 44C.

It will be understood that the first set of flip-flops such as 82A and 86A will store the history of the original bits which causes a delay in the output signal sufficient to let each block equalization be subsequent in time to the previous block equalization. All the data input circuitry 62, 82, and 86 are clocked by the clock 68.

While the invention has been described in conjunction with a specific best mode, it is to be understood that many alternatives, modifications, and variations will be apparent to those skilled in the art in light of the aforegoing description. For example, the circuitry necessary for recovery of the output signals could be designed without undue experimentation by one skilled in the art from the aforegoing description of the output signals. Accordingly, it is intended to embrace all such alternatives, modifications, and variations which fall within the spirit and scope of the included claims. All matters set forth is herein or shown in the accompanying drawings are to be interpreted in an illustrative and non-limiting sense.

The invention claimed is:

1. A signal equalization method comprising:
   propagating a signal pulse through a frequency dependent lossy medium, the signal pulse having a predetermined amplitude and a predetermined duration;
   propagating a main equalization pulse after the signal pulse, the main equalization pulse having a negative amplitude less than the predetermined amplitude of the signal pulse and a duration equal to the predetermined duration of the signal pulse; and
   propagating a block equalization pulse after the main equalization pulse, the block equalization pulse having a negative amplitude less than the amplitude of the main equalization pulse and of a duration substantially greater than the duration of the main equalization pulse.

2. The signal equalization method as claimed in claim 1 including:
   propagating a secondary block equalization pulse after the block equalization pulse, the secondary block equalization pulse having a negative amplitude equal to or less than the amplitude of the block equalization pulse and of a duration substantially equal to the duration of the block equalization pulse.

3. The signal equalization method as claimed in claim 1 wherein:
   the block equalization pulse has a duration which is equal to a multiple of the duration of the main equalization pulse.

4. The signal equalization method as claimed in claim 1 including:
   subsequent block equalization pulses having durations greater than preceding block equalization pulses and magnitudes which are less.

5. The signal equalization method as claimed in claim 1 including:
   recovering the signal, main equalization, and block equalization pulses as an output pulse from the frequency dependent lossy medium;
   and wherein:
   propagating the block equalization pulse propagates a pulse having a magnitude and duration which causes the output pulse to have a negative tail.

6. The signal equalization method as claimed in claim 1 including:
   recovering the signal, main equalization, and block equalization pulses as an output pulse from the frequency dependent lossy medium;
   and wherein:
   propagating the block equalization pulse propagates a pulse having a negative amplitude less than a fraction of the amplitude of the main equalization pulse and a duration which is a multiple of the duration of the main equalization pulse whereby the opening of an eye pattern of the output signal is maximized.

7. A digital equalization method comprising:
   providing a plurality of digital bits at a first rate, each of said digital bits having a predetermined amplitude and a predetermined duration;
   converting the plurality of digital bits into a plurality of signal pulses at a second rate which is a multiple of the first rate, each of the plurality of signal pulses having an amplitude substantially greater than the predetermined amplitude and a duration substantially equal to the predetermined duration, each of the plurality of signal pulses further having a negative equalization pulse associated therewith having a magnitude greater than the predetermined magnitude and a duration of about the predetermined duration; and
   using the plurality of digital bits to provide a plurality of negative block equalization pulses at the first rate, each of the block equalization pulses associated with a negative equalization pulse and having a magnitude substantially less than the magnitude of the negative equalization pulse and a duration which is the multiple of the second rate over the first rate times the duration of the negative equalization pulse.

8. The digital equalization method as claimed in claim 7 including:
   using the plurality of digital bits to provide a plurality of secondary negative block equalization pulses at the first rate, each of the secondary block equalization pulses following the block equalization pulses and having an amplitude and duration similar to the amplitude and duration of the block equalization pulses.

9. The digital equalization method as claimed in claim 7 wherein:
   the block equalization pulse has a duration which is equal to a multiple of the duration of a main equalization pulse.

10. The digital equalization method as claimed in claim 7 including:

subsequent block equalization pulses having durations which are equal to multiples of the duration of a main equalization pulse and declining amplitudes.

11. The digital equalization method as claimed in claim 7 wherein:
propagating the block equalization pulse propagates a pulse having a magnitude and duration which causes the output pulse to have a negative tail.

12. The digital equalization method as claimed in claim 7 wherein:
propagating the block equalization pulse propagates a pulse having a negative amplitude less than a fraction of the amplitude of a main equalization pulse and a duration which is a multiple of the duration of the main equalization pulse whereby the opening of an eye pattern of the output signal is maximized.

13. A signal equalization system comprising:
data input circuitry receiving a plurality of digital bits and outputting a plurality of parallel signal pulses;
data output circuitry connected to the data input circuitry to receive the plurality of parallel signal pulses and to serialize the parallel signal pulses and provide serialized signal pulses with a negative equalization pulse after each of the serialized signal pulses; and
main block equalization circuitry connected to the data input circuitry to receive the plurality of parallel signal pulses and to provide a negative main block equalization pulse after each of the negative equalization pulses, the main block equalization pulse having an average magnitude of the plurality of parallel signal pulses and a duration which is the sum of the durations of the plurality of parallel signal pulses.

14. The signal equalization system as claimed in claim 13 including:
secondary data input circuitry receiving the data input signals and providing a plurality of delayed parallel secondary signal pulses; and
secondary block equalization circuitry connected to the secondary data input circuitry for receiving the plurality of delayed parallel secondary signal pulses and providing a negative secondary block equalization pulse delayed until after each main block equalization pulse and having a magnitude and duration about equal thereto.

15. The signal equalization system as claimed in claim 14 including:
tertiary data input circuitry connected to the secondary data input circuitry and providing a plurality of delayed parallel tertiary signal pulses; and
tertiary block equalization circuitry connected to the tertiary data input circuitry and responsive to the delayed parallel secondary signal pulses to provide a tertiary block equalization pulse delayed until after each secondary block equalization pulse.

16. The signal equalization system as claimed in claim 15 including:
inputs for providing binary signals to the data input circuitry to cause the parallel signal pulses; and
frequency dependent lossy media for receiving an output pulse and the main, secondary, and tertiary block equalization pulses.

17. The signal equalization system as claimed in claim 15 including:
frequency dependent lossy media transmitting the serialized signal pulses, the negative equalization pulses, and the block equalization pulses as an output pulse having a negative tail.

18. A digital equalization system comprising:
input circuitry including a plurality of flip-flops having a plurality of signal outputs;
an output multiplexer connected to the plurality of signal outputs capable of providing an amplified signal pulse followed by a negative equalization pulse; and
an inverting block equalization multiplexer connected to the plurality of flip-flops capable of receiving signals therefrom, averaging the signals, and providing an inverted main block equalization pulse after the negative equalization pulse.

19. The digital equalization system as claimed in claim 18 including:
a secondary series of data flip-flops including:
a first series of secondary flip-flops connected to the plurality of signal outputs, and
a second series of secondary flip-flops connected to the first series of secondary flip-flops; and
a secondary inverting block equalization multiplexer connected to the second series of secondary flip-flops capable of providing a secondary inverted block equalization pulse after the inverted main block equalization pulse.

20. The digital equalization system as claimed in claim 19 including:
a tertiary series of data flip-flops including:
a first series of tertiary flip-flops connected to the first series of secondary flip-flops, and
a second series of tertiary flip-flops connected to the first series of tertiary flip-flops; and
a tertiary inverting block equalization multiplexer connected to the second series of tertiary flip-flops, the tertiary inverting block equalization multiplexer capable of providing a tertiary inverted block equalization pulse after the inverted main block equalization pulse.

21. The digital equalization system as claimed in claim 20 including:
a frequency dependent lossy medium connected to an output and the inverting, secondary, and tertiary block equalization multiplexers;
a mechanism for recovering the amplified signal, main, secondary, and tertiary block equalization pulses as an output pulse from the frequency dependent lossy medium whereby the output pulse has a maximized eye pattern for recovery of a binary output signal.

* * * * *